(12) United States Patent
Sood

(10) Patent No.: US 11,651,704 B2
(45) Date of Patent: May 16, 2023

(54) SYSTEM AND METHOD FOR AUTOPRODUCING A LEARNING PLAN

(71) Applicant: Verint Americas Inc., Alpharetta, GA (US)

(72) Inventor: Ashish Sood, Glasgow (GB)

(73) Assignee: Verint Americas Inc., Alpharetta, GA (US)

( * ) Notice: Subject to any disclaimer, the term of this patent is extended or adjusted under 35 U.S.C. 154(b) by 686 days.

(21) Appl. No.: 16/672,959

(22) Filed: Nov. 4, 2019

(65) Prior Publication Data

US 2020/0143702 A1    May 7, 2020

Related U.S. Application Data

(60) Provisional application No. 62/754,965, filed on Nov. 2, 2018.

(51) Int. Cl.
*G06F 16/23* (2019.01)
*G09B 19/00* (2006.01)
*G06N 5/02* (2023.01)

(52) U.S. Cl.
CPC ......... *G09B 19/00* (2013.01); *G06F 16/2379* (2019.01); *G06N 5/027* (2013.01)

(58) Field of Classification Search
CPC ...... G09B 19/00; G06F 16/2379; G06N 5/027
USPC .......................................................... 706/47
See application file for complete search history.

(56) References Cited

U.S. PATENT DOCUMENTS

2016/0364115 A1* 12/2016 Joung .................... G09B 19/00
2019/0385471 A1* 12/2019 Harris ............... G06F 16/90335

* cited by examiner

*Primary Examiner* — Sibte H Bukhari
(74) *Attorney, Agent, or Firm* — Christopher M. Scherer; Erin Ella Block; DeWitt LLP

(57) ABSTRACT

The present invention is a method and system for automatically producing a learning plan. Upon receiving at least one type of data input, the system analyzes the data input and produces a learning plan based on the results of the analysis of the data input. This process may be used to either generate or update a learning plan, and may be repeated to update an existing learning plan.

20 Claims, 4 Drawing Sheets

SYSTEM AND METHOD FOR AUTOPRODUCING A LEARNING PLAN

CROSS-REFERENCE TO RELATED APPLICATIONS

This application claims the benefit of prior-filed, U.S. Provisional Patent Application No. 62/754,965, filed on Nov. 2, 2018, the contents of which are incorporated herein by reference in their entirety.

BACKGROUND

The present disclosure is directed to a method for computer analysis, specifically a method for analyzing data and creating a learning plan.

In modern business environments, learning plans are designed to address gaps in an employee's skillset and work towards specific goals. By way of non-limiting example, many high-volume customer engagement centers (CECs) require utilization of a wide variety of communication protocols and resources for various customer contacts and communications. Computerized scripts provide predetermined optimized customer service dialogue, desktop help screens provide information outside of normal channels, quality assurance systems provide real-time monitoring of the quality of an employee's work product, software routing engines direct communications to appropriate employees, and so forth.

A new employee begins without any familiarity with the systems used by their employers or the myriad resources available to them. As a result, they may use these systems and resources inefficiently or completely miss vital protocols and resources. Employees with low proficiencies in certain skills may require additional training and assistance. Furthermore, when a new system or other resource becomes available, an employee may initially be unfamiliar with how to best integrate it into their existing work routine. A new system or other resource may have a synergistic effect when used another system or other resource, but be useless or even detrimental without combination of the functions. Any of the above scenarios may lead to work errors, delay, missed or improper communications, decreased efficiency, or increased customer dissatisfaction.

For example, an employee assigned to communicate with a high-value customer may mistakenly continue to use an old communication protocol as opposed to a new protocol designed to take into account the customer's new preferences. By the time the employee is informed of their mistake, the customer relationship may be damaged. In another example, a new employee may receive an email because it was flagged for potentially fraudulent activity, but not know how to access a routing log listing why the email was flagged. This employee is required to undertake time-consuming research and review, potentially delaying a transaction that was not fraudulent, but had still triggered an automatic fraud review protocol. An employee may be the only member of an institution to have a high competency in a difficult subject which requires frequent retraining due to evolving regulations. Failure to properly continue training for the employee may result in a loss of their unique competency. In another example, a new resource may be vital to a first employee in one company division, while only occasionally useful to a second employee in a different company division. Prioritizing training in the resource for both employees would be a poor use of institutional resources.

Unfortunately, supervisory or human resources (HR) staff may suffer many of the same problems when designing learning plans for employees. If, for example, a member of HR staff is unaware of continuing education requirements, they are unable to include these requirements in a learning plan. If a member of supervisory staff is unaware of new resources for their division, they cannot instruct employees under them to acquire the skills needed to utilize these resources. Furthermore, members of HR or supervisory staff may not be objective in assigning or evaluating an employee's continuing education. Companies with large numbers of employees may be unable to timely and adequately monitor individual employee compliance with established learning plans, while large numbers of incoming employees may overwhelm HR staff and lead to delays in forming individualized learning plans. Rather than relying on goals for the employee set by supervisory or HR staff, use of an automated system could determine the goals that a learning plan needs to achieve for each specific employee.

There is an unmet need in the art for a system and method capable of automatically assessing an employee's skill and learning level. There is a further unmet need in the art for a system and method capable of integrating these assessments with a complimentary learning program to address deficiencies and maintain core competencies.

SUMMARY

An exemplary embodiment of the present application is a method for automatically producing a learning plan. The method receives at least one type of data input, analyzes the data input, and produces a learning plan based on the results of the analysis of the data input.

Another exemplary embodiment of the present application is a system for automatically producing a learning plan. The system includes a processor and a non-transitory computer readable medium programmed with computer readable code that upon execution by the processor causes the processor to execute the above-mentioned method for automatically producing a learning plan.

Another exemplary embodiment of the present application is a non-transitory computer readable medium programmed with computer readable code that upon execution by a processor causes the processor to execute the above-mentioned method for automatically producing a learning plan.

The objects and advantages will appear more fully from the following detailed description made in conjunction with the accompanying drawings.

BRIEF DESCRIPTION OF THE DRAWING(S)

DETAILED DESCRIPTION

Figure 1:
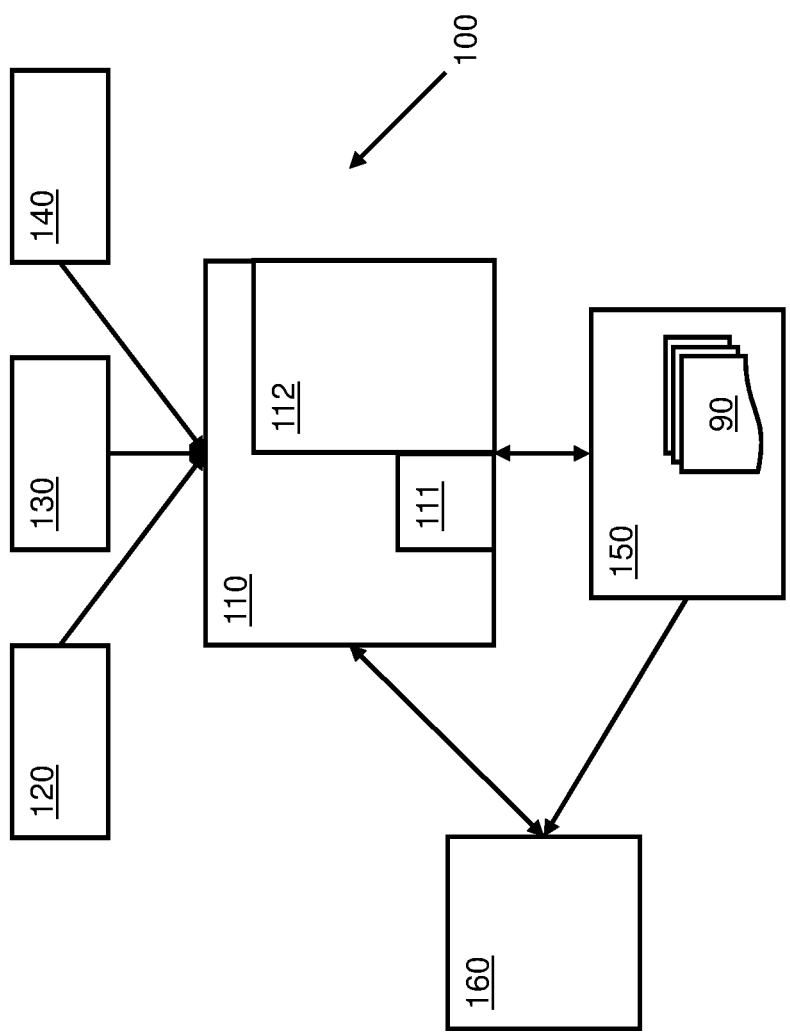
FIG. 1 depicts an exemplary embodiment of a planning system for creating a learning plan.

In the present description, certain terms have been used for brevity, clearness and understanding. No unnecessary limitations are to be applied therefrom beyond the requirement of the prior art because such terms are used for descriptive purposes only and are intended to be broadly construed. The different systems and methods described herein may be used alone or in combination with other systems and methods. Various equivalents, alternatives and modifications are possible within the scope of the appended claims. Each limitation in the appended claims is intended to invoke interpretation under 35 U.S.C. § 112, sixth paragraph, only if the terms "means for" or "step for" are explicitly recited in the respective limitation.

In CEC and other business environments, learning plans are designed to address gaps in an employee's skillset and work towards specific goals. Rather than goals for the employee being set by a supervisor or HR, the planning system instead determines the goals that a learning plan needs to achieve for each specific employee. These goals are based on the overall goals of the company, the specific requirements of the employee's position, and the employee's current skill level. For a customer-service company such as a CEC, typical goals are to decrease Average Handling Time (AHT), and increase Customer Satisfaction scores (CSAT).

The planning system receives and performs analysis of at least one of the following base data types. Such base data may be received as input from an automated system (including the planning system itself or an external system), manually input, or a combination of the two. Base data may be weighted according to predetermined criteria. The base data types may include, in both the short and the long trend, any and/or all of the following:

Types of incoming work

Over what channels the work arrives

How work is distributed among employees

What tasks similar employees are able to perform

The skills gap between an employee's current capabilities and a required, desired, or projected skill level Existing or projected demands for skills, both in terms of skills and skill levels required, along with any certification and/or continuing education requirements Quality Assurance (QA) scores of the employee's previous work across the work type(s) of interest and/or all work types Any other data of use or interest This analysis leads to generation of the optimal, individual learning plan for each employee. Changes in performance and adherence to the learning plan may be monitored, with progress (or lack thereof) reported to a third party or used to adjust the learning plan. Feedback metrics may include improvement or decline in any skill or work quality data originally included in the base data, or to any other metric. In a CEC, feedback metrics could include changes to the AHT and CSAT. The learning plan may also be automatically modified when any of the base data changes, e.g. changes to work channels or education requirements.

FIG. 1 depicts an exemplary embodiment of a planning system 100 for creating a learning plan 90. Planning system 100 includes a planning analytics engine 110 which receives input from at least one base data source 120, feedback data source 130, and/or external system 140 to produce at least one learning plan 90. Production of the learning plan 90 may entail generating a new learning plan 90 and/or updating an existing learning plan 90. An optional learning plan database 150 allows storage of learning plans 90, while a desktop 160 allows additional input to planning analytics engine 110 as well as display of learning plans 90.

The planning analytics engine 110 is configured to receive and analyze data within planning system 100. Analysis may be a real-time analysis of streaming data or batch analysis of data. The planning analytics engine 110 includes at least one set of analytics rules 111 used to analyze data. The analytics rules 111 determine responses to information extracted from base data and/or feedback data, creating learning plan 90. The analytics rules 111 may be static or may be dynamically updated by planning analytics engine 110, external system 140, and/or an employee or third party utilizing desktop 160. Updates may be manual or automatic. Automatic updates to analytics rules 111 may be triggered by meeting certain criteria within analytics rules 111 of planning analytics engine 110 or within external system 140, or may occur at predetermined intervals. The analytics rules 111 may be software programs or separate files executed by a software program.

In certain embodiments, the planning analytics engine 110 generates at least one compliance metric 95 utilizing the results of the analysis and comparison with the learning plan 90. The compliance metric 95 measures a user's compliance with the learning plan 90. In certain embodiments, the planning analytics engine 110 also includes planning analytics memory 112. The planning analytics memory 112 can store learning plans 90, data used for analysis, the results of that analysis, analytics rules 111, or any other information or data used by planning system 100.

While the exemplary embodiment includes one planning analytics engine 110, planning system 100 may include more planning analytics engines 110. In embodiments with multiple planning analytics engines 110, CAEs 110 may be constantly connected, periodically connected, interconnected through at least one external system 140, learning plan database 150, and/or desktop 160, or separate. In embodiments with a single planning analytics engine 110, planning analytics engine 110 is connected, directly or indirectly, to all external systems 140, learning plan databases 150, and/or desktops 160.

The external systems 140 may be connected to planning analytics engine 110, other external systems 140, learning plan databases 150, and/or desktops 160. In certain embodiments, some external systems 140 connect planning analytics engine 110 to certain other external systems 140 and/or learning plan databases 150. The external systems 140 provide different data and functionalities to planning system 100. By way of non-limiting example, external system 140 may be an email system, texting system, telephone system, internet access system, and/or another system for customer interaction. By way of another non-limiting example, external system 140 may be a customer service protocol database, work resource system, human resources system, internal work system, scheduling and/or calendaring system, and/or another system internal to a business.

A single external system 140 may perform multiple processes, a single process, and/or part of a larger process. In embodiments with multiple planning analytics engines 110, each planning analytics engine 110 may be connected to a unique set of external systems 140 or may share all or some specific external systems 140. External systems 140 can be updated by adding, updating, or removing specific external systems 140. The connections between planning analytics engines 110, external systems 140, learning plan databases 150, and desktops 160 may also be updated.

The external system 140 may also provide input from base data source 120 and feedback data source 130 to planning analytics engine 110 for analysis, or may analyze such data and apply the results directly. By way of non-limiting example, external systems 140 may perform voice and text analytics, quality analytics, analytics relating to usage of desktop 160 or other available resources, and any other analysis related to an employee's activities during customer service interactions. The external systems 140 may provide the results of such analyses to planning analytics engine 110 or to other external systems 140. By way of further non-limiting example, external systems 140 may also interact with the functions of desktop 160. Such interactions may allow another desktop 160 to observe and/or share another desktop 160, and utilize, update, or transmit or retrieve information to or from certain functions of the desktop 160.

The learning plan databases 150 are connected to planning analytics engine 110 and may be connected to other learning plan databases 150 and/or external systems 140. The learning plan databases 150 store learning plans 90 for use by planning system 100 and system users. System users can include employees to whom learning plans 90 are directed, and HR and/or supervisory staff. By way of non-limiting example, learning plan databases 150 may store standardized and/or pregenerated learning plans 90 for basic onboarding of new employees, various iterations of specific learning plans 90, learning plans 90 for a specific employee, and/or any combination thereof. The learning plans 90 stored in learning plan databases 150 may be categorized by employee, date created and/or updated, business division, purpose, or any other possible classification schema. The learning plan databases 150 can be updated by adding, changing, or removing learning plans 90. The connections between planning analytics engine 110, external systems 140, and learning plan databases 150 may also be updated.

The desktop 160 receives and displays learning plans 90 from learning plan databases 150 and/or planning analytics engines 110. Processes from external systems 140 may also interact with the processes of desktop 160. By way of non-limiting example, an external system 140 may receive an email sent by an employee from desktop 160, analyze its content, and determine if the employee's writing skills have improved. Optionally, desktop 160 may also be used to provide input from base data source 120 or feedback data source 130, modify analytics rules 111, or submit a request to planning analytics engine 110.

Figure 2A:
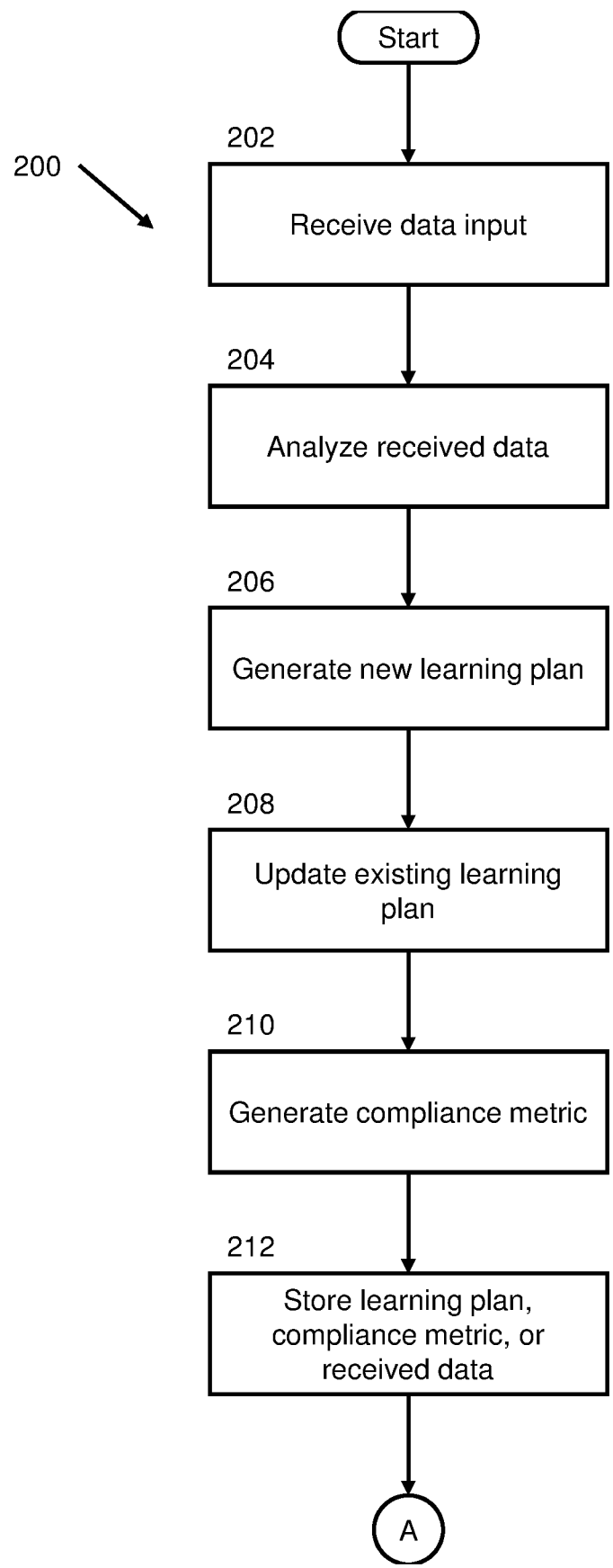
FIGS. 2a and 2b depict a flowchart of an exemplary embodiment of a method for creating the learning plan.
Figure 2B:
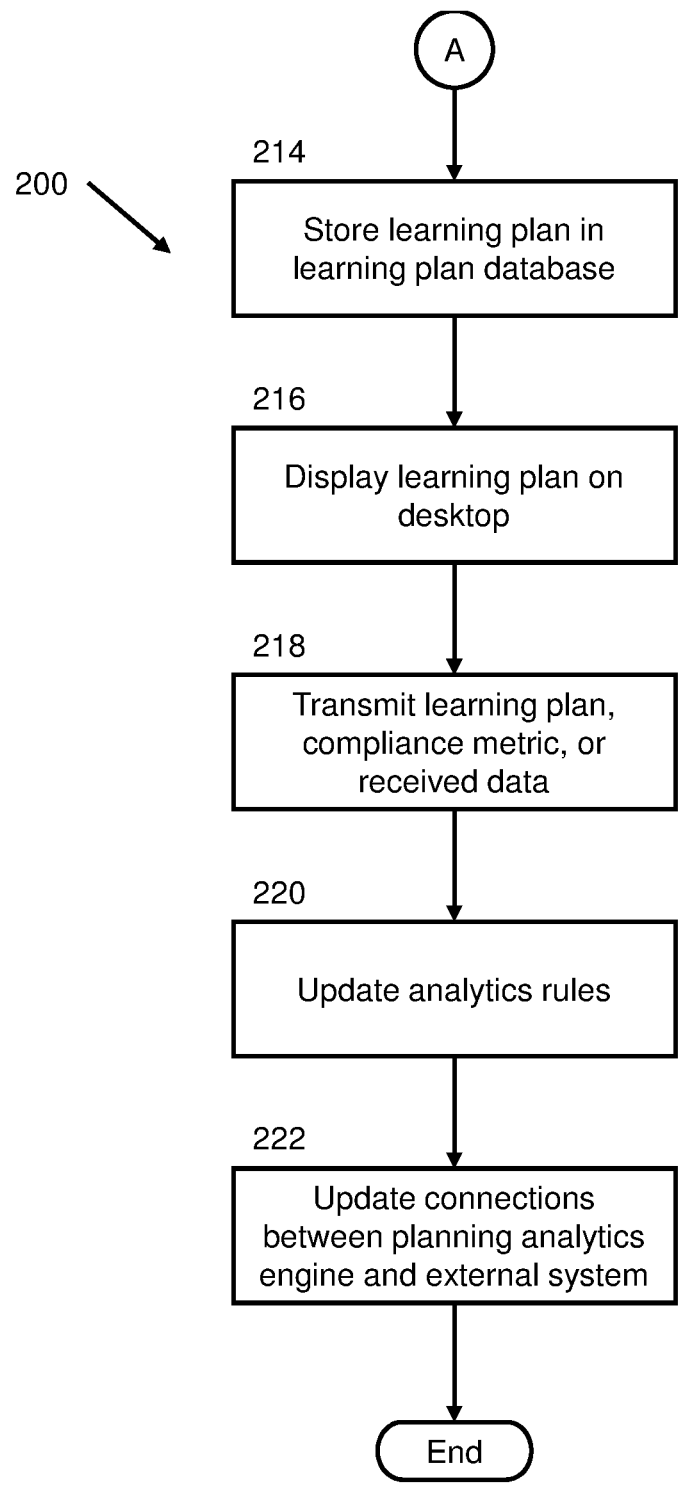

FIGS. 2*a* and 2*b* depict a flowchart of an exemplary embodiment of a method 200 for creating and modifying learning plan 90. It should be understood that the arrangement of the steps of method 200 may be reordered and/or certain steps performed simultaneously as long as the fundamental function of method 200 remains unaltered.

In step 202, the planning analytics engine 110 of the planning system 100 receives data input from at least one base data source 120, feedback data source 130, and/or input from at least one external system 140.

In step 204, the planning analytics engine 110 utilizes at least one set of analytics rules 111 to analyze received data. This analysis may be a real-time analysis of streaming data or batch analysis of data.

In optional step 206, the planning analytics engine 110 generates at least one new learning plan 90 utilizing the results of the analysis of step 204.

In optional step 208, the planning analytics engine 110 updates at least one existing learning plan 90 utilizing the results of the analysis of step 204.

In optional step 210, the planning analytics engine 110 generates at least one compliance metric 95 utilizing the results of the analysis of step 204.

In optional step 212, planning system 100 stores at least one of the learning plan 90, the compliance metric 95, or received data in the planning analytics memory 112.

In optional step 214, planning system 100 stores at least one learning plan 90 in the learning plan database 150.

In optional step 216, planning system 100 displays at least one learning plan 90 on at least one desktop 160.

In optional step 218, the planning system 100 transmits at least one of the learning plan 90, the compliance metric 95, or received data to at least one external system 140 or at least one desktop 160.

In optional step 220, the planning system 100 updates the analytics rules 111 of the planning analytics engine 110.

In optional step 222, the planning system 100 updates the connections between planning analytics engine 110 and at least one external system 140. External systems 140 can be updated by adding, updating, or removing specific external systems 140.

It should be understood that method 200 may be divided into separate parts and practiced separately. By way of non-limiting example, steps 202, 204, and 208 may be repeated multiple times to update an existing learning plan multiple times.

Figure 3:
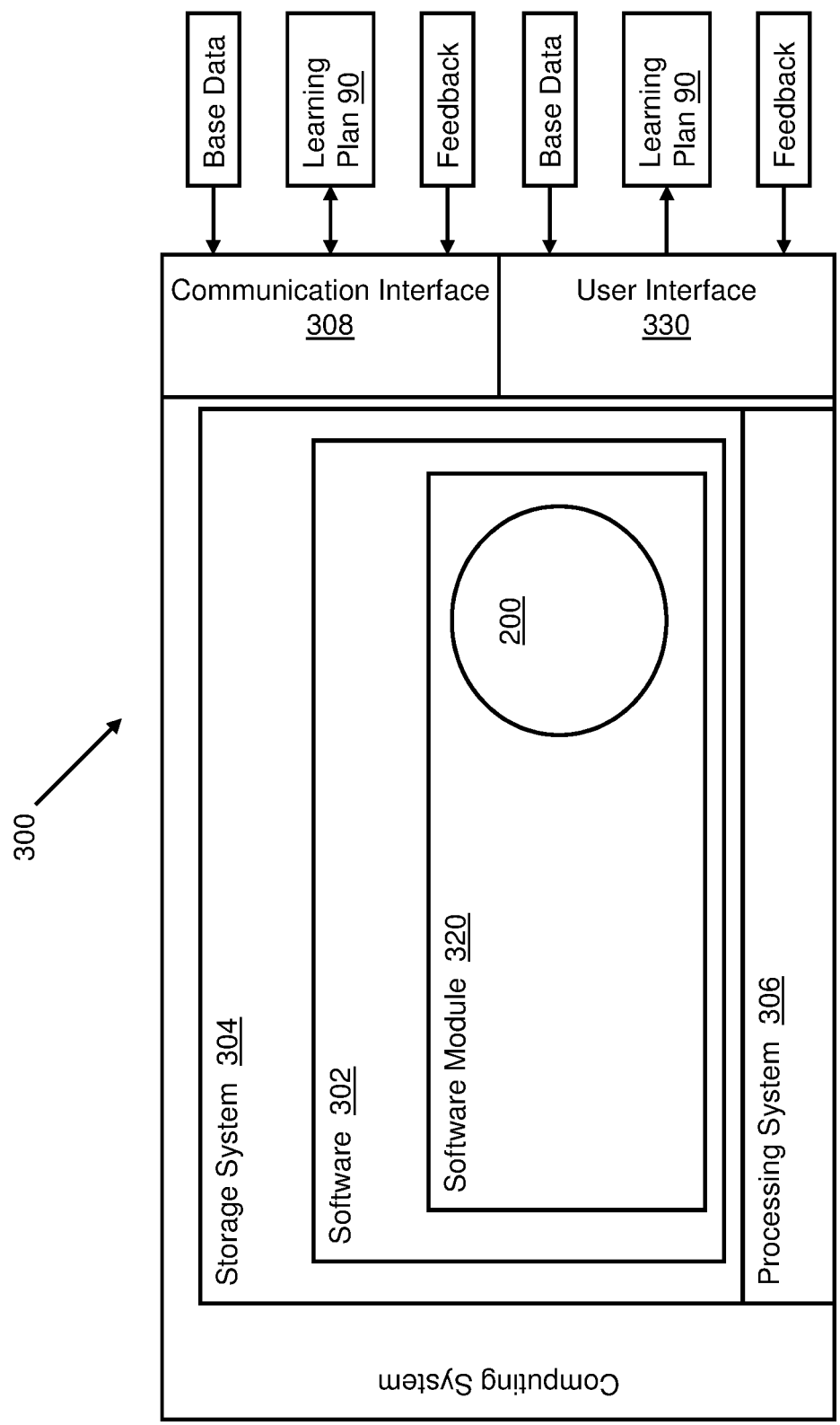
FIG. 3 depicts an exemplary embodiment of a computing system for performing the method for creating the learning plan.

FIG. 3 depicts an exemplary embodiment of computing system 300 for performing method 200 for creating learning plan 90.

The system 300 is generally a computing system that includes a processing system 306, a storage system 304, software 302, a communication interface 308, and a user interface 310. The processing system 306 loads and executes software 302 from the storage system 304, including a software module 320. When executed by computing system 300, software module 320 directs the processing system 306 to operate as described in herein in further detail in accordance with the method 200.

The computing system 300 includes a software module 320 for generating learning plan 90. Although computing system 300 as depicted in FIG. 3 includes one software module 320 in the present example, it should be understood that more modules could provide the same operation. Similarly, while the description as provided herein refers to a computing system 300 and a processing system 306, it is to be recognized that implementations of such systems can be performed using one or more processors, which may be communicatively connected, and such implementations are considered to be within the scope of the description. It is also contemplated that these components of computing system 300 may be operating in a number of physical locations.

The processing system 306 can comprise a microprocessor and other circuitry that retrieves and executes software 302 from storage system 304. The processing system 306 can be implemented within a single processing device but can also be distributed across multiple processing devices or sub-systems that cooperate in existing program instructions. Non-limiting examples of processing systems 306 include general purpose central processing units, application specific processors, and logic devices, as well as any other type of processing device, combinations of processing devices, or variations thereof.

The storage system 304 can comprise any storage media readable by processing system 306, and capable of storing software 302. The storage system 304 can include volatile and non-volatile, removable and non-removable media implemented in any method or technology for storage of information, such as, but not limited to, computer readable instructions, data structures, program modules, or other information. The storage system 304 can be implemented as a single storage device but may also be implemented across multiple storage devices or sub-systems. The storage system 304 can further include additional elements, such a controller capable of communicating with the processing system 306.

Non-limiting examples of storage media include random access memory, read only memory, magnetic discs, optical discs, flash memory, virtual memory, and non-virtual memory, magnetic sets, magnetic tape, magnetic disc storage or other magnetic storage devices, or any other medium which can be used to store the desired information and that may be accessed by an instruction execution system, as well as any combination or variation thereof, or any other type of storage medium. In some implementations, the storage media can be a non-transitory storage media. In some implementations, at least a portion of the storage media may be transitory. Storage media may be internal or external to system 300.

As described in further detail herein, computing system 300 receives and transmits data through communication interface 308. The data can include any of the above base data types, updates to learning plan 90, feedback related to learning plan 90, and/or any other data that may pertain to the creation, modification, or execution of learning plan 90. In embodiments, the communication interface 308 also operates to send and/or receive information, such as, but not limited to, additional information to/from external systems 140 to which computing system 300 is communicatively connected, input related to initial and updated base data, updates to learning plan 90, feedback related to learning plan 90 and/or any other information that may pertain to the creation or execution of learning plan 90.

The user interface 310 can include one or more of a mouse, a keyboard, a voice input device, a touch input device for receiving a gesture from a user, a motion input device for detecting non-touch gestures and other motions by a user, and/or other comparable input devices and associated processing elements capable of receiving user input from a user. Output devices such as, but not limited to, a video display or graphical display can display textual or video portions of learning plan 90, related documents, or another interface further associated with embodiments of the system and method as disclosed herein. Speakers, printers, haptic devices and other types of output devices may also be included in the user interface 310. Employees, supervisory or HR staff, or other staff can communicate with computing system 300 through the user interface 310 in order to view learning plan 90, base data, feedback, and documents, enter or receive base data or other information, enter feedback, manage an interaction or back-office task, or any number of other tasks the employee or other staff may want to complete with computing system 300.

In the foregoing description, certain terms have been used for brevity, clearness, and understanding. No unnecessary limitations are to be inferred therefrom beyond the requirement of the prior art because such terms are used for descriptive purposes and are intended to be broadly construed. The different configurations, systems, and method steps described herein may be used alone or in combination with other configurations, systems and method steps. It is to be expected that various equivalents, alternatives and modifications are possible within the scope of the appended claims.

What is claimed is:

1. A method for automatically producing a learning plan, comprising:
   receiving data input from a base data source, the data input from the based data source including work and skill forecast data, a current assessed skill level, a difference in the current assessed skill level and an overall group skill level, and a projected skill level;
   monitoring a communication system, an internet access system, and desktop usage by an external system;
   performing quality analytics on the monitoring of the communication system, the internet access system, the desktop usage and generating quality assurance scores from the quality analytics;
   analyzing the data input and quality assurance scores, wherein analyzing the data input and the quality assurance scores comprises utilizing at least one set of analytics rules within a planning analytics engine to analyze the data input and the quality assurance scores;
   producing a learning plan based on results of the analyzing of the data input and quality assurance scores, a set of overall company goals, a set of requirements for a position, and the current assessed skill level;
   receiving additional data input from the base data source, including updated work and skill forecast data, an updated current assessed skill level, an updated difference in the current assessed skill level and the overall group skill level, and an updated projected skill level;
   performing updated quality analytics on the monitoring of the communication system, the internet access system, the desktop usage and generating updated quality assurance scores from the updated quality analytics;
   analyzing the data input, the additional data input, the quality assurance scores, and the updated quality assurance scores; and
   producing an updated leaning plan based on results of the analyzing of the data input and quality assurance scores, a set of overall company goals, a set of requirements for a position, and the current assessed skill level.

2. The method of claim 1, wherein data input is also received from one or more feedback data sources or one or more external systems.

3. The method of claim 1, wherein producing the learning plan comprises generating a new learning plan.

4. The method of claim 1, wherein producing the learning plan comprises modifying an existing learning plan.

5. The method of claim 1, further comprising generating at least one compliance metric based on results of the analyzing of the data input and quality assurance scores.

6. The method of claim 1, further comprising storing at least one of the learning plan, a compliance metric, or the data input in a planning analytics memory.

7. The method of claim 1, further comprising storing at least one learning plan in a learning plan database.

8. The method of claim 1, further comprising displaying at least one learning plan on at least one desktop.

9. The method of claim 1, further comprising transmitting at least one of the learning plan, a compliance metric, or the data input to at least one external system or at least one desktop.

10. The method of claim 1, further comprising updating the at least one set of analytics rules of the planning analytics engine.

11. The method of claim 1, further comprising automatically modifying at least one learning plan upon determination of a change to the data input.

12. The method of claim 1, further comprising modifying at least one connection between a planning analytics engine and at least one external system.

13. A system for automatically producing a learning plan, comprising:
   a processor; and a non-transitory computer readable medium programmed with computer readable code that upon execution by the processor causes the system to:

receive data input from a base data source, the data input from the based data source including work and skill forecast data, a current assessed skill level, a difference in the current assessed skill level and an overall group skill level, and a projected skill level;

monitor a communication system, an internet access system, and desktop usage by an external system;

perform quality analytics on the monitoring of the communication system, the internet access system, the desktop usage and generating quality assurance scores from the quality analytics;

analyze the data input and quality assurance scores, wherein analyzing the data input and the quality assurance scores comprises utilizing at least one set of analytics rules within a planning analytics engine to analyze the data input and the quality assurance scores;

produce a learning plan based on results of the analysis of the data input and quality assurance scores, a set of overall company goals, a set of requirements for a position, and the current assessed skill level receive additional data input from the base data source, including updated work and skill forecast data, an updated current assessed skill level, an updated difference in the current assessed skill level and the overall group skill level, and an updated projected skill level;

perform updated quality analytics on the monitoring of the communication system, the internet access system, the desktop usage and generating updated quality assurance scores from the updated quality analytics;

analyze the data input, the additional data input, the quality assurance scores, and the updated quality assurance scores; and produce an updated leaning plan based on results of the analyzing of the data input and quality assurance scores, a set of overall company goals, a set of requirements for a position, and the current assessed skill level.

14. The system of claim 13, wherein data input is also received from one or more feedback data sources or one or more external.

15. The system of claim 13, wherein the processor is operatively coupled to a planning analytics memory comprising at least one set of analytics rules.

16. The system of claim 13, wherein the processor is operatively coupled to at least one base data source, at least one learning plan database, or at least one desktop.

17. The system of claim 16, wherein the at least one learning plan database comprises a plurality of learning plans.

18. A non-transitory computer readable medium comprising computer readable code to execute a method for automatically producing a learning plan on a system that when executed by a processor, causes the system to:

receive data input from a base data source, the data input from the based data source including work and skill forecast data, a current assessed skill level, a difference in the current assessed skill level and an overall group skill level, and a projected skill level;

monitor a communication system, an internet access system, and desktop usage by an external system;

perform quality analytics on the monitoring of the communication system, the internet access system, the desktop usage and generating quality assurance scores from the quality analytics;

analyze the data input and quality assurance scores, wherein analyzing the data input and the quality assurance scores comprises utilizing at least one set of analytics rules within a planning analytics engine to analyze the data input and the quality assurance scores;

produce a learning plan based on results of the analysis of the data input and quality assurance scores, a set of overall company goals, a set of requirements for a position, and the current assessed skill level receive additional data input from the base data source, including updated work and skill forecast data, an updated current assessed skill level, an updated difference in the current assessed skill level and the overall group skill level, and an updated projected skill level;

perform updated quality analytics on the monitoring of the communication system, the internet access system, the desktop usage and generating updated quality assurance scores from the updated quality analytics;

analyze the data input, the additional data input, the quality assurance scores, and the updated quality assurance scores; and produce an updated leaning plan based on results of the analyzing of the data input and quality assurance scores, a set of overall company goals, a set of requirements for a position, and the current assessed skill level.

19. The non-transitory computer readable medium of claim 18, wherein data input is also received from one or more feedback data sources or one or more external systems.

20. The non-transitory computer readable medium of claim 18, further causing the system to generate at least one compliance metric based on results of the analyzing of the data input and quality assurance scores.

* * * * *